United States Patent [19]

Ishii et al.

[11] Patent Number: 4,872,068
[45] Date of Patent: Oct. 3, 1989

[54] DISK PLAYING METHOD RESULTING IN REDUCED START-UP TIME

[75] Inventors: Hidehiro Ishii; Junichi Yoshio; Osamu Watanabe; Takeshi Izumo; Noriyoshi Takeya; Kazuhiko Katakami; Masayori Shinohara; Masao Yoshida, all of Saitama, Japan

[73] Assignee: Pioneer Electronic Corporation, Tokyo, Japan

[21] Appl. No.: 149,763

[22] Filed: Jan. 27, 1988

[30] Foreign Application Priority Data

Jan. 28, 1987 [JP] Japan .................................. 62-19350
May 14, 1987 [JP] Japan ................................ 62-117867
Jun. 19, 1987 [JP] Japan ................................ 62-152472
Jun. 19, 1987 [JP] Japan ................................ 62-152475

[51] Int. Cl.⁴ .............................................. G11B 7/00
[52] U.S. Cl. .................................... 358/342; 358/341; 360/19.1; 360/72.1; 360/72.2; 360/48
[58] Field of Search ................................ 358/341–343; 360/72.1, 72.2, 59, 48, 19.1, 39, 53

[56] References Cited

U.S. PATENT DOCUMENTS 4,660,100  4/1987  Sugiyama et al. .................. 358/342

Primary Examiner—Robert L. Richardson
Attorney, Agent, or Firm—Sughrue, Mion, Zinn, Macpeak & Seas

[57] ABSTRACT

A method and device for playing a composite disk containing separate audio-only and video-plus-audio portions in which the time until the commencement of the playing of the video-plus-audio portion is reduced. When playing of only the video-plus-audio portion is designated, a data detection point of the pickup is immediately moved toward the lead-in area of that portion, whereupon reproduction is started immediately. In another embodiment, index data is directly read from the lead-in area of the video-plus-audio portion without reading similar data for the audio-only portion. When the playing of the video-plus-audio portion is completed, the pickup is stopped at a rest position corresponding to the lead-in area of the second region.

6 Claims, 9 Drawing Sheets

FIG. 3
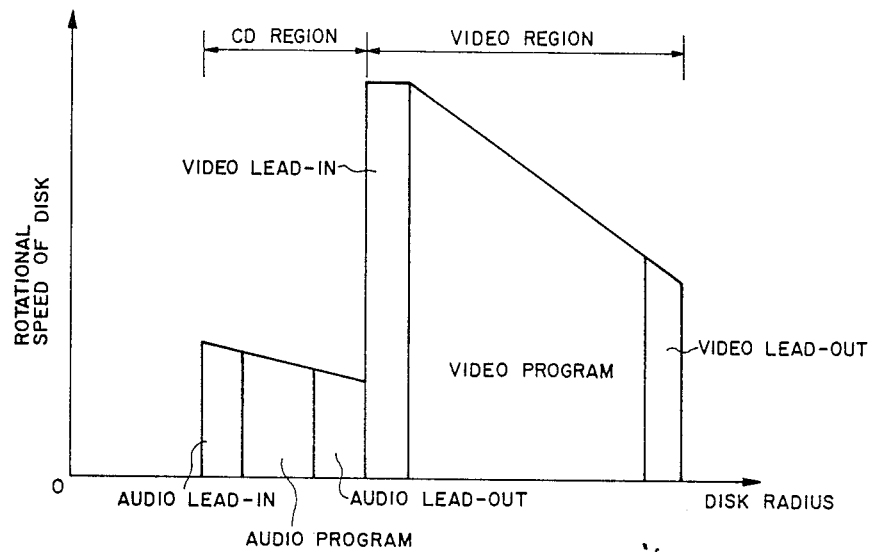
FIG. 4A
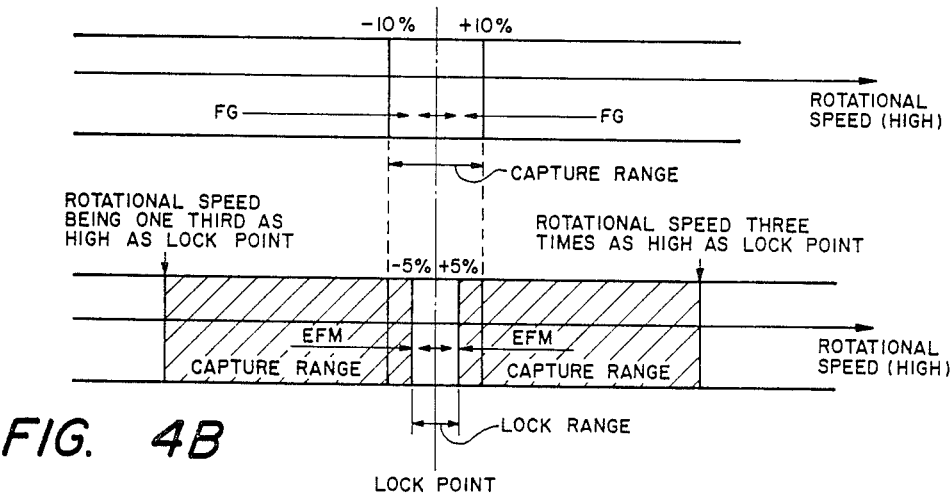
FIG. 4B

DISK PLAYING METHOD RESULTING IN REDUCED START-UP TIME

BACKGROUND OF THE INVENTION

A compact disk (CD) is an example of a data recording disk on which a digital signal is recorded. A CD is a small digital audio disk having a diameter of about 12 cm. Recently, another type of disk, referred to as a composite disk or CDV, has been placed on the market which has the same dimensions as a CD and on which an FM modulated video signal and a PCM (Pulse Code Modulation) signal are recorded in a multiplexed form in addition to an another signal recorded solely in PCM form.

In such a composite disk, as shown in FIG. 1, the two types of data are recorded in two respective distinct regions of the disk. In a first region 1a (hereinafter referred to as a CD region) in an inner circumferential portion of the disk, a PCM audio data signal is recorded, and in a second region 1b (hereinafter referred to as a video region), an FM modulated video signal and a PCM audio signal are recorded in multiplexed form. Higher frequency components are contained in the video signal relative to the PCM signal, the frequency spectrum of the signal recorded in the video region 1b being as shown in FIG. 2. In FIG. 2, the components designated by A are the PCM signal and those designated by B are the video FM signal.

When a signal is recorded in the video region 1b, it is required to increase the rotational speed of the disk compared with the case of recording signal in the CD region 1a. Therefore, the video region 1b must be played at a higher rotational speed than the CD region 1a. As shown in FIG. 3, the rotational speed is several hundred r.p.m. for the CD region 1a, whereas the speed must be much higher for the video region, namely, about two thousand, several hundred r.p.m. at the innermost circumference of the video region 1b and about one thousand, several-hundred r.p.m. at the outermost circumference of the video region 1b.

The composite disk is, as shown in FIG. 3, provided with a lead-in area for each of the CD region and the video region, and a TOC (Table of Contents), indicative of the contents of programs for the respective regions, is recorded in each of the lead-in areas. Further, identification data is contained in the TOC of the audio lead-in area which indicates whether the disk has a video region or not.

When only the video region on a composite disk is to be played, the TOC data recorded in the lead-in area of the CD region is firstly read out to confirm that the disk includes the video region, and then the data detection point of the pickup is moved toward the lead-in area of the video region to start reading the data recorded in that area.

However, in such a playing method, a step of reading the recording data in the lead-in area of the CD region is always required, thereby causing a delay in the start of the playing of the vide region.

Moreover, a so-called hi-ii video disk has recently been made available, which is a disk on which a frequency modulated video signal and a prescribed digital signal are recorded in a multiplexed form. In this type of disk, a signal record as in a conventionally known video disk and a digital audio signal in a CD format are superimposed and the resultant signal is recorded.

In a reproducing apparatus for reproducing such a hi-fi video disk, a spindle servo is provided for controlling the rotation of a spindle motor which drives the disk on the basis of a phase difference between a horizontal sync signal included in the reproduced video signal and a reference sync signal so as to maintain a servo lock condition. However, since the servo lock range is narrow, typically in a range of—10% to 10% relative to the lock point (target rotational speed—see FIG. 4A), a pull-in operation has been performed during the so-called rough servo period to force the speed of the spindle motor into a lock range based on the output of a frequency generator ganged with the spindle motor.

As such, the conventional device is disadvantageous in that the cost of the device cannot be adequately reduced due to the fact that the lock range of the spindle servo is narrow and thus the frequency generator and associated components, which are generally expensive, are required. Also, the disadvantages of the hi-fi video disk also apply to the spindle servo during the reproduction of the video region of a composite disk.

As mentioned above, in a CD player, index data indicative of the program contents of the disk, i.e., the TOC, is recorded in the lead-in area of the disk. When the disk is loaded in the CD player or when the playing of the disk is ended, the pickup, which is movable in the radial direction of the disk and mounted on a slider, is moved toward the lead-in area at the innermost circumferential portion of the disk. Upon detecting the arrival of the pickup at the lead-in area by a position sensor switch, the pickup is held in the lead-in are until a new operation instruction is received. The position where the pickup is held is referred to as the rest position.

In the case of a CDV disk, a lead-in area is provided for each of the CD region and the video region. A TOC indicative of the program contents is provided for each of the respective lead-in areas. Accordingly, since the lead-in area of the CD region is determined as the rest position of the pickup, a problem arises in that, when only the video region is to be played, particularly when the video regions Of a plurality Of CDV disks are successively to be played, the pickup must be moved to the lead-in area of the video region from the lead-in are of the CD region, whereby a considerable time delay occurs between issuing an instruction to commence the reproduction of the video region upon depressing a PLAY key and the actual commencement of reproduction.

SUMMARY OF THE INVENTION

The present invention has been made in view of the foregoing, and, accordingly, it is an object of the present invention to provide a composite disk playing method in which the playing of the video region is quickly started when the playing of only the video region is instructed.

In accordance with the above and other objects, a first embodiment of a playing method according to the invention is characterized in that, when the playing of only the video region is instructed at the start of the playing a composite disk, a data detection point of the pickup is immediately moved toward a lead-in area of the video region and reading of recorded data is started from that lead-in area.

A further object of the invention is to provide a spindle servo device for a data recording disk reproducing apparatus which can be manufactured at a low cost by eliminating a frequency generator and its associated circuits a used in the prior art device.

In satisfaction of this object and in accordance with a further embodiment of the invention, a spindle servo device is provided for a disk reproducing apparatus which reproduces a data recording disk containing a region where a frequency modulated video signal and a prescribed digital signal are recorded in multiplexed form at a location at least partially in the radial direction of the disk, the spindle servo device being constructed so that, at least at the time the servo loop is being pulled toward lock, a phase difference between the synchronizing signal contained in the reproduced digital signal and the reference signal is detected and, based on the thus-detected phase difference, the rotational speed of the spindle motor is controlled.

A still further object of the invention is to provide a playing method for playing a data recording disk with which video reproduction can be quickly commenced when only the reproduction of the video region of the CDV disk is desired.

The CDV disk to be played according to the present invention includes a first region (CD region) in which a digitized audio data signal is recorded and a second region (video region) in which a superimposed signal of a video data signal and a prescribed digital signal is recorded, and index data indicative of the recording contents is recorded in a lead-in area of each of the first and second regions.

A further embodiment of the playing method in accordance with the present invention is characterized in that, when an instruction to play only the second region of the CDV disk is issued, the index data recorded in the lead-in area of the second region is read without reading the index data recorded in the lead-in area of the first region, and the pickup is rested at a position in the lead-in area of the second region when the playing of the second region is ended.

It is yet another object of the invention to provide a reproducing method for a disk reproducing device capable of shortening the period of time during which no data are obtained When recording data in video regions of a plurality of composite disks are sequentially reproduced.

In accordance with the above object, the invention further provides a reproducing method for a disk reproducing device characterized in that, for reproducing data on each of a plurality of disks by sequentially selecting one of the plurality of disks accommodated in a plurality of disk accommodation positions and conveying the selected one of the disks to a reproducing position, a pickup is immediately moved to a position corresponding to a predetermined portion within a second region on which a video signal and a prescribed digital signal are recorded in a superimposed form. After the selected disk has been conveyed to the reproducing position, judgment is made as to whether or not the output of the pickup contains predetermined data recorded in the predetermined portion within the second region. After reproducing the entirety of the second region in accordance with the result of this judgment, another disk to be subsequently reproduced is selected.

BRIEF DESCRIPTION OF THE DRAWINGS

FIG. 3 is a diagram showing distinctions of recording regions of a composite disk;

FIGS. 4A and 4B are diagrams showing the relationship between the rotational speed of a spindle and a servo capture range;

DESCRIPTION OF THE PREFERRED EMBODIMENTS

Preferred embodiments of the present invention will be described in detail with reference to the accompanying drawings.

Figure 5:
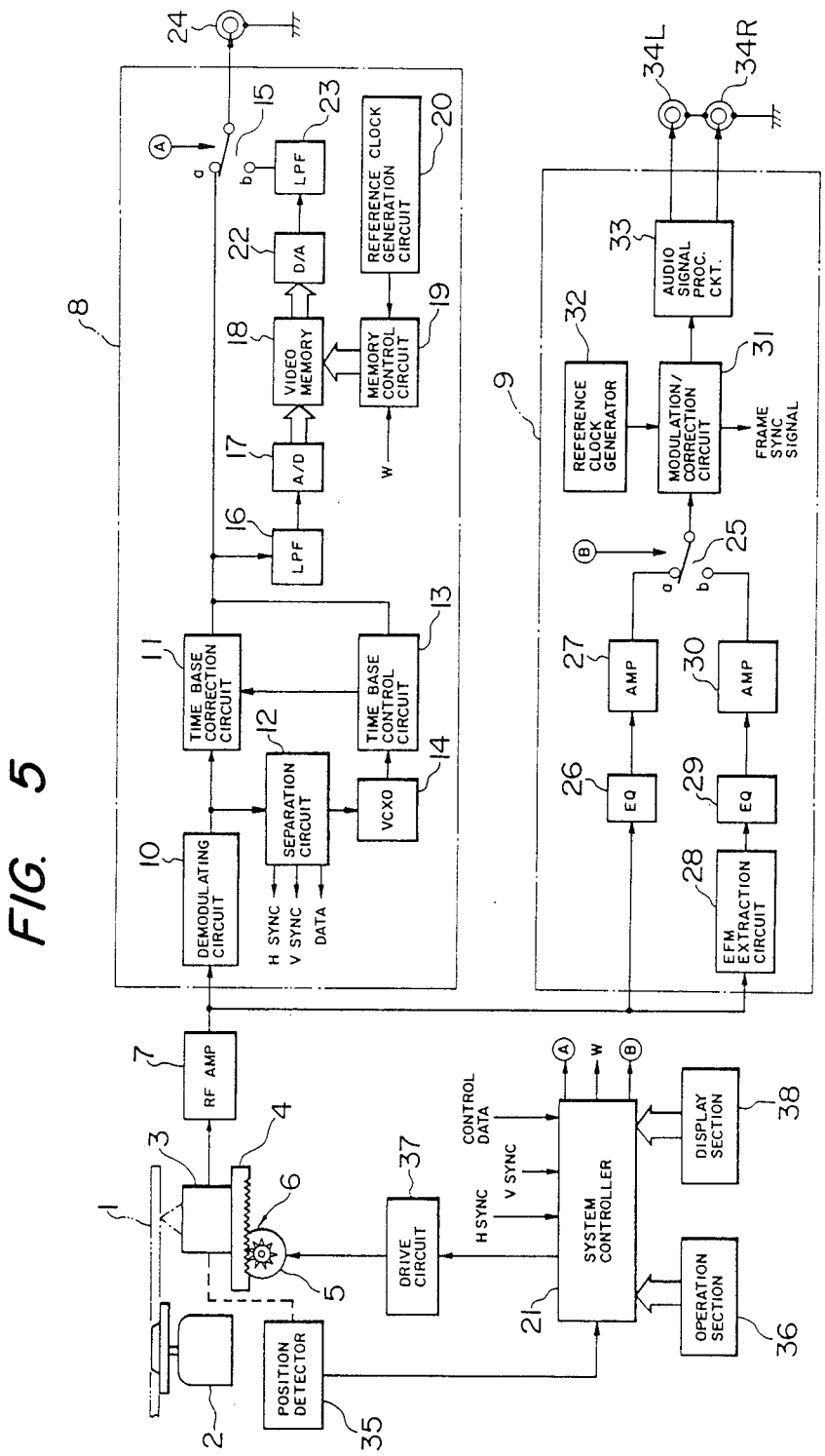
FIG. 5 is a block diagram showing an example of a disk playing apparatus to which a disk playing method of the present invention is applied.

FIG. 5 is a block diagram showing an example of a disk playing device to which the playing method according to the present invention is applied. In this figure, a disk 1 is driven for rotation by a spindle motor 2, and the data recorded thereon is sensed by an optical pickup 3. The pickup 3 incorporates; an optical system including a laser diode, an objective lens, and a photodetector; a focus actuator for moving the objective lens along the optical axis relative to the data recording surface of the disk 1; and a tracking actuator for shifting the beam spot (data detection point) of the beam emitted by the pickup 3 in the radial direction of the disk. The pickup 3 is mounted on a slider 4, which is freely movable in the radial direction of the disk. A slider motor 5 is provided as a driving source for the slider 4. The slider 4 is moved linearly by means of a transfer mechanism 6 composed of, for example, a rack and a pinion. An RF (Radio Frequency) signal outputted by the pickup 3 is supplied through an RF amplifier 7 to both a video data demodulating circuit 8 and digital data demodulating circuit 9.

In the video data demodulating circuit 8, an RF signal fed from the RF amplifier 7 is demodulated to a video signal in a demodulating circuit 10, and thereafter the resultant signal is fed to both a time base correction circuit 11 and a sync signal separation circuit 12. In the separation circuit 12, a horizontal (H) sync signal and a vertical (V) sync signal, are extracted and separated. The time base correction circuit 11 which may be implemented, for example, with a variable delay element such as CCD (Charge Coupled Device), performs time base correction by changing the amount of delay imposed by a variable delay element in response to a control signal supplied from a time base control circuit 13. The time base control circuit 13 produces a control signal corresponding to phase differences between an oscillation output from a crystal oscillator (VCXO) 14 and its frequency division output and a horizontal sync signal and a color burst signal, the latter two being passed through the time base correction circuit 11. The crystal oscillator (VCXO) 14 oscillates in synchronization with, for example, the horizontal sync signal extracted by the separation circuit 12. An example of the specific arrangement of the time base control circuit 13 is described in Japanese Patent Application Laid-Open Publication No. 56-102182.

The video signal which has been subjected to time base correction is applied to one input of a selection switch 15 and is further supplied through a LPF (Low-Pass Filter) 16 to an A/D (Analog/Digital) Converter 17. In the A/D converter 17, the video signal is sampled at a predetermined rate, and the sampled values are sequentially converted to digital data. The output data of the A/D converter 17 is supplied to a video memory 18, which may, for example, be a RAM (Random Access Memory). The video memory must have a storage capacity capable of storing at least one field of video data. Address and mode control of the video memory 18 are implemented by a memory control circuit 19. The memory control circuit 19 effects control so as to sequentially read out data stored at the respective addresses of the video memory 18 in accordance with clock pulses fed from a reference clock generation circuit 20. The memory control circuit 19 further controls the rewriting of the contents at the respective addresses of the video memory 18 in response to a write enable signal outputted from a system controller 21 (described below).

The data read out of the video memory 18 is converted into an analog signal by a D/A (Digital-/Analog) converter 22, and the resulting signal applied to an analog selection switch 15 The movable contact of the selection switch 15 is normally at the contact a so that the video signal directly fed from the time base correction circuit 11 is supplied to a video output terminal 24. The movable contact of the selection switch 15 is moved to the contact b in response to a change-over instruction from the system controller 21, thereby selecting the video signal fed through the video memory 18 and supplying it to the video output terminal 24.

In the digital data demodulating circuit 9, on the other hand, a selection switch 25 is provided which is switched depending upon the region to be played (CD region or video region) when a composite disk is to be reproduced. The movable contact of the switch 25 is at the contact a when the CD region is played. The change-over of the movable contact of the switch 25 is performed in response to a change-over instruction generated from the system controller 21.

Figure 1:
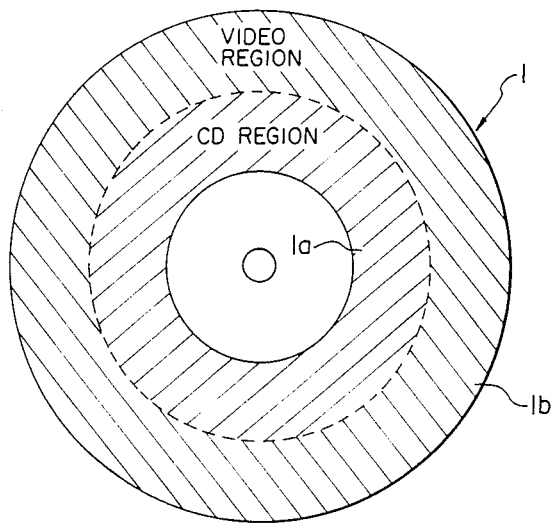
FIG. 1 is a diagram showing recording areas of a composite disk.
Figure 2:
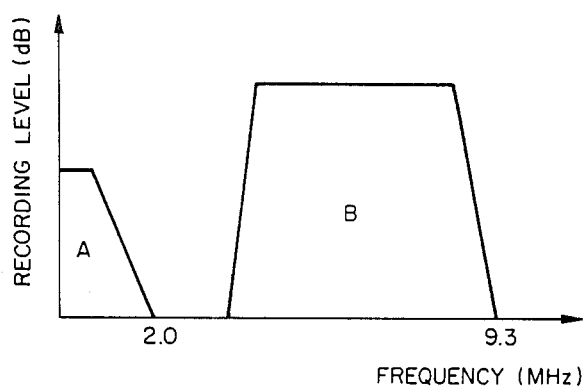
FIG. 2 is a diagram showing the frequency spectra of signals recorded in the video region of a composite disk.

For a composite disk, as previously described with reference to FIG. 3, the rotational speed of the disk varies greatly between the CD region and the video region. Furthermore, the PCM audio signal is preferably an EFM (Eight-to-Fourteen Modulation) signal superimposed on an FM modulated video signal for recording in the video region. However, the presence of an EFM signal adversely affects the lower frequency components of the FM video signal. For this reason, the EFM signal is recorded at a level several tens of dB lower than the level of the video carrier while maintaining a modulation degree of the same value (see FIG. 2). Accordingly, the frequency characteristics and amplitudes of the same EFM signal are different when playing the CD region and the video region. On the other hand, by appropriately switching the signal processing circuit of the reproduced EFM signal between the CD region and the video region a common demodulating circuit ca be used.

More specifically, when playing the CD region, the reproduced RF signal is an EFM signal, the frequency characteristic of which is compensated in an equalizer circuit 26 having a predetermined equalizing characteristic and then amplified with a predetermined gain by an amplifier 27. When playing the video region, on the other hand, only an EFM signal, which together with the FM video signal is contained in the reproduced RF signal, is extracted by an EFM extraction circuit 28 (which may be implemented with an LPF), and the frequency characteristic of the thus extracted EFM signal is compensated in an equalizer circuit 29 having an equalizing characteristic different from that of the equalizer circuit 26. Further, the output of the equalizer circuit 29 is amplified by an amplifier 30 which has a larger gain than the amplifier 27. Thus, an EFM signal is outputted which has the same frequency characteristic and amplitude as in the CD region.

It is to be noted that the selection switch 25 is normally at the contact a when a compact disk being played.

The reproduced EFM signal selected by the selection switch 25 is supplied to a modulation/correction circuit 31. In the circuit 31, the EFM signal is subjected to EFM demodulation and the resultant signal is rewritten in a memory, which may be a RAM. The RAM is controlled based on clock pulses generated by a reference clock generator 32 to perform deinterleaving through a data exchanging process and error correction using parity bits contained in the data. Further, a frame sync signal, detected from the corrected signal in the demodulation/correction circuit 31, is subjected to signal processing in an audio signal processing circuit 33 composed of a D/A converter and deglitching circuit, and thereafter supplied to audio output terminals 34L and 34R for left and right channels.

Proximate to the path of movement of the pickup 3 in the radial direction of the disk there is provided a position detector 35 which detects the arrival of the beam spot emitted by the pickup 3 at a position corresponding to the vicinity of the boundary between the CD region and the video region of the composite disk and in response generates a detection signal. Conventionally known devices, such as an optical sensor, can be used as the position sensor 35.

The detection signal outputted by the position sensor 35 is supplied to the system controller 21. The system controller 2 is constituted by a microcomputer inclusive of a CPU (Central Processing Unit), ROM (Read-On Memory), and RAM. To the system controller 21 are supplied: the horizontal sync signal, vertical sync signal and control data from the separation circuit 12; a frame sync signal from the demodulation/correction circuit 31; and disk designation data indicative of which disk is to be played and mode designation data indicative of which region of the composite disk is to be played, i.e., the CD region only, the video region only, or both regions. The designation data is supplied from an operation section 36. In the system controller 21, the CPU processes input signals in accordance with programs which have previously been stored in the ROM and controls various elements, such as the selection switches 15 and 25, the memory control circuit 19, the drive circuit 37 for driving the slider frame sync signals from the demodulation/correction circuit 31 during the playing of the disk.

It should be noted that, during the playing of the composite disk, rotational control of the spindle motor 2 is carried out, regardless of the playing region, on the basis of a spindle error signal produced in response to the frequencies of and the phase difference between the frame sync signal in the EFM signal and the reference clock.

Figure 6:
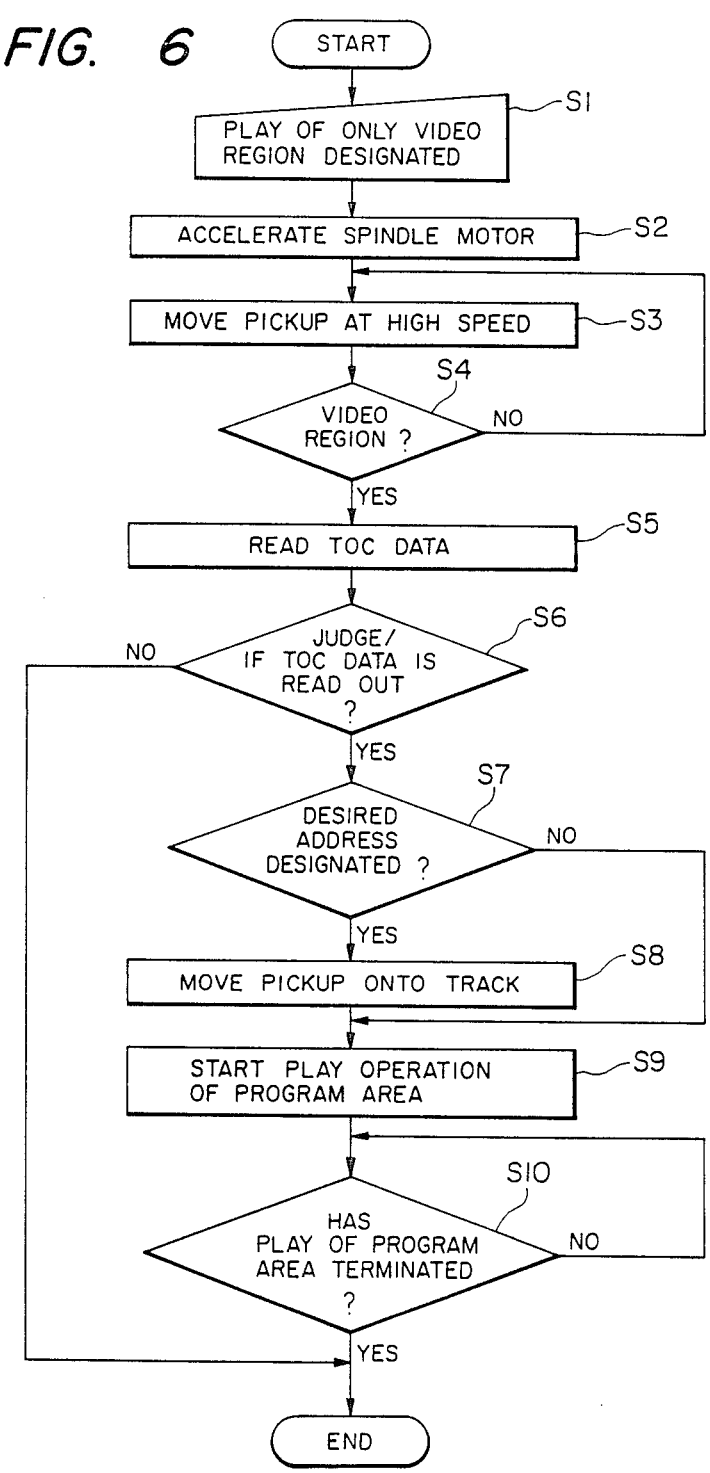
FIG. 6 is a flowchart showing the procedure of a disk playing method according to the invention executed by a CPU.

In playing a composite disk with the disk playing device arranged as described above, a description will next be made with reference to the procedures of the playing method of the present invention executed by the CPU constituting the system controller, this description being made with reference to the flowchart shown in FIG. 6. It is assumed that the disk has already been set at the proper playing position on the spindle. The following description of the playing procedure is directed to the case where the playing of only the video region is designated.

Firstly, when the playing of only the video region is designated by the operation section 36 (Step S1), the CPU, upon reception of the mode designation data, immediately causes the spindle motor to accelerate to reach the maximum rotational speed for the video region (Step S2). At the same time, the CPU causes a carriage motor 5 to rotate at a high speed to thereby move the pickup 3 toward the video region at a high speed (Step S3). Thereafter, on the basis of the detection output of the position sensor 35, when it is judged &hat the beam spot (data detection spot) of the pickup 3 has reached the lead-in area of the video region (Step S4), the TOC data recorded in the lead-in area is read (Step S5).

When it is judged that the TOC data in the video lead-in area has been read out (Step S6), judgment is made whether or not the desired address has been designated (Step S7). If affirmative, the beam spot of the pickup 3 is moved onto a track at the designated address (Step S8). Thereafter the playing operation of the program area is started (Step S9). In t he case no address is designated, the procedure goes directly to step S9 and the program area following the video lead-in area is played. When it is judged that the playing of the program area has terminated (Step S10), a series of playing operations of the video region only is ended. In the case of designation of only the video region, it is possible to perform reproduction in several special modes such as search, scan, program play, and repeat.

If only the video region is designated to be played but the disk in fact does not have a video region, the playing operation is stopped at the time when it is judged that no TOC data is read out in Step S6 since reading of TOC data cannot be performed in Step S5. Instead of ending the playing operation, the beam spot of the pickup 3 may be shifted to the lead-in area of the CD region so that, upon reading TOC data in that area, playing of the CD region may be started. In a device capable of playing a disk selected from among a plurality of disks, the playing operation of other disks may then be carried out.

As described above, according to the disk playing method of the present invention, when only the video region of a composite disk is designated to be played, the data detection point of the pickup is immediately moved toward the lead-in area of the video region and reading of the recorded data is started from that lead-in area. Therefore, the playing of the video region can be quickly started.

Another preferred embodiment of the present invention will now be described in detail with further reference to the accompanying drawings.

Figure 7:
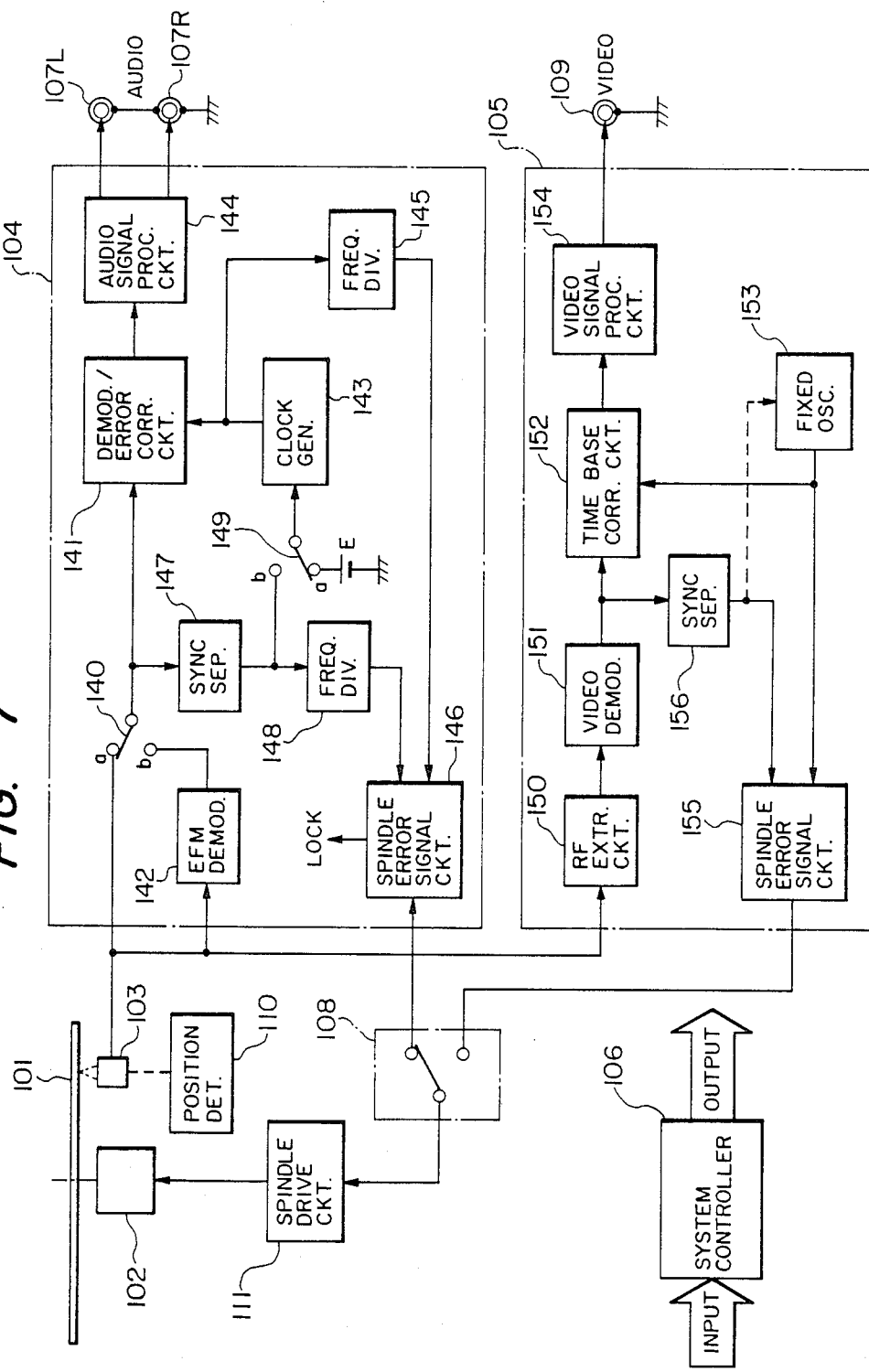
FIG. 7 is a block diagram showing an arrangement of a reproducing apparatus which is capable of reproducing a composite disk to which a spindle servo device according to the present invention is applied.

FIG. 7 is a block diagram showing a reproducing apparatus provided with a spindle servo device constructed according to the invention. This reproducing apparatus is capable of reproducing a composite disk, for example. The reproducing apparatus is also capable of reproducing a compact disk.

A disk 101 is rotated by a spindle motor 102 and the data recorded on the disk 101 is sensed by an optical pickup 103. The pickup 3 incorporates a laser diode as a light source, an optical system including an Objective lens, a photodetector receiving light reflected from the disk 101, a focus actuator for controlling the position of the objective lens so that the laser spot emitted by the laser diode is formed on the recorded surface of the disk, and a tracking actuator for controlling the position of the laser spot so as to move it in the radial direction of the disk to follow a recording track.

The output from the pickup 103 is supplied to both a digital data demodulating circuit 104 and a video data demodulating circuit 105. In the digital data demodulating circuit 104, a switch 140 is provided, the position of which is determined depending upon which reproduction region of the composite disk is being reproduced, i.e., the CD region or the video region. That is, the movable contact of the switch 140 is set to a contact a when the CD region is being reproduced and to a contact b when the video region is being reproduced. The position of the switch 140 is set in response to a changeover instruction from a system controller 106, which will be described below in detail.

The PCM audio signal recorded in the CD or video region may be an EFM signal, in which case the reproduced EFM signal at the output of the pickup 103 is supplied directly to a demodulation/error correction circuit 141 through the switch 140 when the CD region is being reproduced. When the video region is being reproduced, the reproduced EFM signal, which is extracted from the output of the pickup 103 by an EFM extracting circuit 142, is supplied through the switch 140 to the demodulation/error correction circuit 141.

While subjecting the reproduced EFM signal to EFM demodulation and writing the resulting signal into a memory (not shown) implemented, for example, as a RAM (Random Access Memory), the demodulation/error correction circuit 141 controls the RAM in accordance with reference clock pulses generated by a clock generator 143, whereby deinterleaving and error correction using parity bits included in the data are performed by appropriately exchanging and rearranging the data. The digital audio signal, after being demodulated and error corrected in the demodulation/error correction circuit 141, is supplied to an audio signal processing circuit 144 for signal processing. The audio signal processing circuit 144 includes a D/A and a deglitching circuit. Thereafter, the resulting signal is supplied to left and right output terminals 107L and 107R.

The clock pulse signal produced by the clock generator 143 is frequency divided by a frequency divider 145 and the frequency divided clock pulses are supplied to a spindle error signal producing circuit 146 which extracts the frequency and phase error with respect to a frequency division signal of a frame sync signal, which is separated and extracted from the reproduced EFM signal by a sync separating circuit 147 and frequency divided by a frequency divider 148. A spindle error signal 9 control signal) is produced based on the errors thus detected. The spindle error signal is supplied to one input terminal of a spindle control switching circuit 108. The output clock generator 143 is connected to the movable contact of a switch 149 having fixed contacts a and b. The position of the switch 149 is set in response to a change-over instruction generated by the system controller 106. Specifically, the movable contact of the switch is set to the contact a when the CD region is being reproduced or for the video region in a rough servo mode (servo unlocked period), and to the contact b when the video region is being reproduced in a precise servo mode (servo locked period). When the switch is connected to the contact a, a D.C. voltage E is applied to the clock generator 143 through the switch 149, whereby a fixed-frequency reference clock signal is generated by the clock generator 143, with the frequency being determined in accordance with the D.C. voltage during the reproduction of the CD region and the rough servo period for the video region. When the switch 149 is connected to the contact b, the frame sync signal is applied through the switch 149 to the clock generator 143, whereby clock pulses in synchronization with the frame sync signal are generated by the clock generator 143 during the precise servo period mode for the video region.

In the video data demodulating circuit 105, an RF (Radio Frequency) signal is extracted by an RF extracting circuit 150 from the output of the pickup 3 obtained when the video region is being reproduced. The extracted RF signal is demodulated to a video signal by a video demodulating circuit 151, and the output of the video demodulating circuit 51 is supplied to a time base correcting circuit 152. The time base correcting circuit 52 carries out time base correction by changing the amount of delay imposed by a variable delay element, such as CCD (Charge-Coupled Device), corresponding to a phase difference between a reference horizontal sync signal, which is the output of a fixed oscillator 153, and a horizontal sync signal and a color burst signal contained in the video signal. The video signal, subjected to time base correction by the time base correction circuit 152, is supplied through a video signal processing circuit 154 to a video output terminal 109. If desired, insertion of character data may be effected at that point.

The reference horizontal sync signal produced by the fixed oscillator 153 is further supplied to a spindle error signal producing circuit 155 where the phase difference between the reference clock and the reproduced horizontal sync signal, separated and extracted from the video signal by a synchronization signal separating circuit 156 is detected, and a spindle error signal is produced in accordance with the phase difference The spindle error signal is supplied to another input terminal of the spindle control switching circuit 108. The spindle error signal selected by the spindle control switching circuit 108 is supplied to a spindle driving circuit 111 which drives and controls a spindle motor 102.

Proximate to the path of movement the pickup 103 in the radial direction of the disk is provided a position detector 110 which detects the position of the laser spot in the radial direction of the disk. The position data provided by the position detector 110 is supplied to the system controller 106. Based on the position data, it is detected when the laser spot has reached the vicinity of the boundary between the CD region and the video region.

The system controller 106 is composed of a microcomputer, which implements data exchanges among various sections in the digital data demodulating circuit 104 and the video data demodulating circuit 105, generates switching instructions supplied to the switches 140 and 149, and also generates a switching signal supplied to the spindle control switching circuit 108.

Next, a reproduction operation in the reproducing circuit thus constructed will be described. It should be noted that, in the lead-in area of the composite disk, disk identification data indicative of the composite disk is recorded.

In reproducing the disk, the system controller 105 judges that the disk being reproduced is a composite disk if appropriate identification data is contained in the lead-in are and judges that the disk is a compact disk when no such identification data is contained therein.

When a compact disk is being reproduced, the switches 140 and 149 are positioned at the contact a until the completion of reproduction. The spindle control switching circuit 108 supplies the spindle error signal from the digital data demodulating circuit 114 to the spindle drive circuit 111. That is, the frequency of the reference clock signal in the digital data demodulating circuit 104 is maintained at constant value, and spindle servo control is effected in accordance with the phase difference between the frequency division signal of the fixed reference clock signal and a frequency division signal of the frame sync signal.

The remainder of the reproduction operation of the compact disk is well known, and thus a further description thereof is omitted.

In the case of a composite disk, on the other hand, the CD region is reproduced in the same way as in the case of the reproduction of a compact disk. Spindle servo control is also similarly effected. When reproducing shifts to the video region, the system controller 106 detects change from the position data supplied from the position detector 110, Then sets the switch 140 to the contact b and controls the spindle motor 102 so that the rotational speed of the spindle is accelerated toward the maximum rotational speed for the video region. At this time, the spindle servo is unlocked and the servo is pulled in in accordance with the phase difference between the frequency division signal of the fixed reference clock signal and the frequency division signal of the reproduced frame sync signal since the switch 109 is then set to the contact a. The servo capture range by the reproduced frame sync signal is as wide as ⅓ to 3 times the rotational speed at the lock point see FIG. 4B), and servo control can be sufficiently stably established within this rotational speed range.

When the rotational speed of the spindle motor 102 has reached the lock-in range, a lock detection signal is produced by a spindle error signal producing circuit 146. The system controller I06 sets the switch 149 to the contact b in response to the lock detection signal and further controls the spindle control switching circuit 108 so as to select the spindle error signal from the video data demodulating circuit 105. Accordingly, during the reproduction of the video region, precise servo control of the spindle motor 2 is carried out after the servo has been locked in response to the phase difference between the reproduced horizontal sync signal detected by the video data demodulating circuit 105 and the reference horizontal sync signal. In the digital data demodulating circuit 104, the reference clock generator 143 produces a reference clock signal in synchronization with the reproduced frame sync signal. Operations such as error correction are carried out in the demodulation/error correction circuit 141 on the basis of the reference clock signal.

In the arrangement above described, a frequency generator and associated circuits, as conventionally required, can be omitted by establishing servo control at the beginning of the reproduction of the video region on the basis of the phase difference between the reproduced frame sync signal contained in the reproduced EFM signal and the reference clock signal. In addition, as shown in FIG. 4B, the lock-in range of the servo by the reproduced frame sync signal contained in the reproduced EFM signal is as narrow as −5% relative to the target rotational speed, which is to be compared with the capture range of the servo by the reproduced horizontal sync signal (FIG. 4A). Therefore, the switching of the servo can be smoothly performed.

Although it has been described in the above embodiment that servo control is effected in response to the spindle error signal detected by the video data demodulating circuit 115 by switching the servo control after the servo system has been locked, it is possible to effect spindle control on the basis of the phase difference between the reproduced frame sync signal contained in the reproduced EFM signal and the reference clock, regardless of the region being reproduced. To this effect, the clock generator 143 is changed to a fixed clock generator and the oscillator 153 in the video data demodulating circuit 105 is arranged (as shown by a dotted line) to oscillate in synchronization with the reproduced horizontal sync signal. In such a modification, since the same CD format is used even if the color television system for the video data is different, the audio data can be reproduced without fail and the video data reproduced at least in monochrome.

Furthermore, although a description has been made with respect to the starting point of the video region of a composite disk, the present invention can be applied to all disks containing digital signals, such as a hi-fi video disk. In addition, the present invention is applicable not only the case of establishing servo lock-in at the time of the start of the playing of the video region but also to the case where servo lock-in is established after the spindle servo has been unlocked to allow the performance of a search operation such as on a CLV (Constant Linear Velocity) disk.

As described above, according to the present invention, the conventionally used frequency generator and its associated circuits can be omitted, and thus the device can be manufactured at a low cost.

Another embodiment of the present invention will be described with reference to the accompanying drawings.

Figure 8:
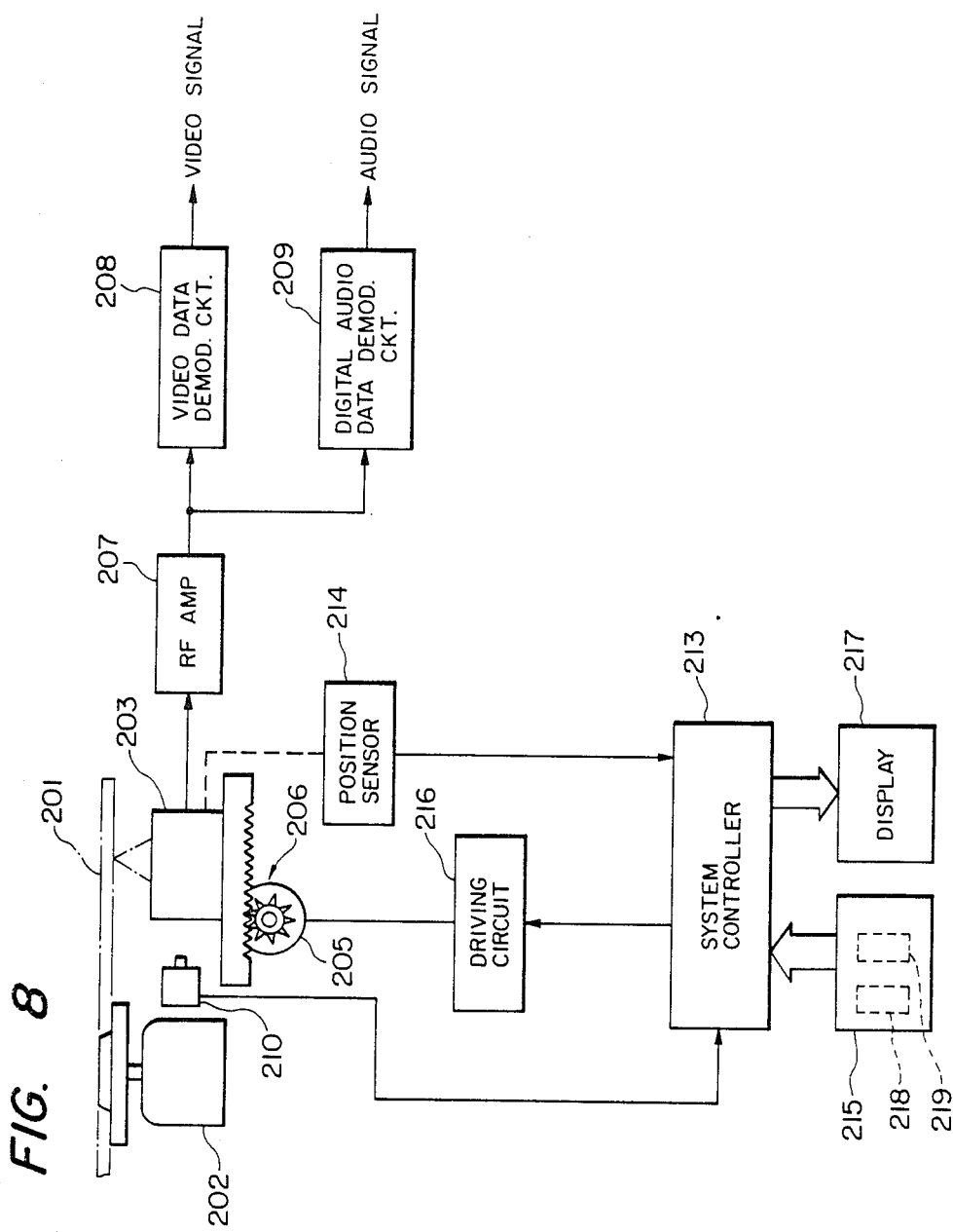
FIG. 8 is a block diagram showing a disk playing device to which another embodiment of a playing method according to the present invention is applied.

FIG. 8 is a block diagram showing the arrangement of a disk playing device to which this embodiment of a data recording disk playing method according to the present invention is applied. In the playing device, a disk 201 is rotationally driven by a spindle motor 202, and data recorded thereon is sensed by an optical pickup 203. Fine servo adjustment of the pickup 203 is performed by moving the data detecting spot in the tangential and radial directions relative to the recorded track. The pickup 203 is mounted on a slider 204 which is movable in the radial direction of the disk and used to carry out coarse adjustment. The slider 204 is linearly moved by a transfer mechanism, which may be a combination of a rack and pinion, to which a slider motor 205 is coupled as a driving source. The RF (Radio Frequency) signal outputted from the pickup 203 is supplied to both a video data demodulating circuit 208 and a digital audio data demodulating circuit 209 through an RF amplifier 207.

A position sensor 210 is provided which is rendered on when the beam spot emitted from the pickup 203 reaches a lead-in area formed at the innermost portion of a CD or CDV disk during the movement of the pickup 203 along its path in the radial direction of the disk. When the position sensor switch 210 is rendered on, a high-level signal is supplied to a system controller 213. A position sensor 214 is provided proximate the path of the pickup 203 which detects when the beam spot emitted by the pickup 203 has entered a position corresponding to the lead-in area of the CDV disk and generates a detection signal at that time. The generation of the detection signal by the position sensor 214 indicates that the pickup 203 has reached the lead-in area of the video region. An optical sensor, sliderpot, mechanical switch, etc., all of which are conventionally known, can be used as the position sensor 214. The detection output from the position sensor 214 is supplied to a system controller 213.

The system controller 213 is constituted with a microcomputer inclusive of a CPU and RAM.

To the system controller 213 are supplied horizontal sync signals, vertical sync signals and control data, all of which are extracted by the video data demodulating circuit 208, and control data from the digital audio data demodulating circuit 209. Various types of instruction data are further supplied to the system controller 213 from an operation section 215. In the operating section 215 there are provided a play key, a track key, a program key, a stop key, a DV designation key for designating that a CDV disk has loaded, and a region designation key for designating which region of the CDV disk is to be reproduced, i.e., only the CD region, only the video region, or both the CD and video regions. In accordance with the operations of these keys, instruction data are supplied to the system controller 213. In the system controller 213, the CPU carries out processing of the input signals in accordance with a program previously stored in the ROM, and controls a driving circuit (not shown) for driving a spindle motor 202, a driving circuit 216 for driving a slider motor 205, and a display section 217.

Figure 9:
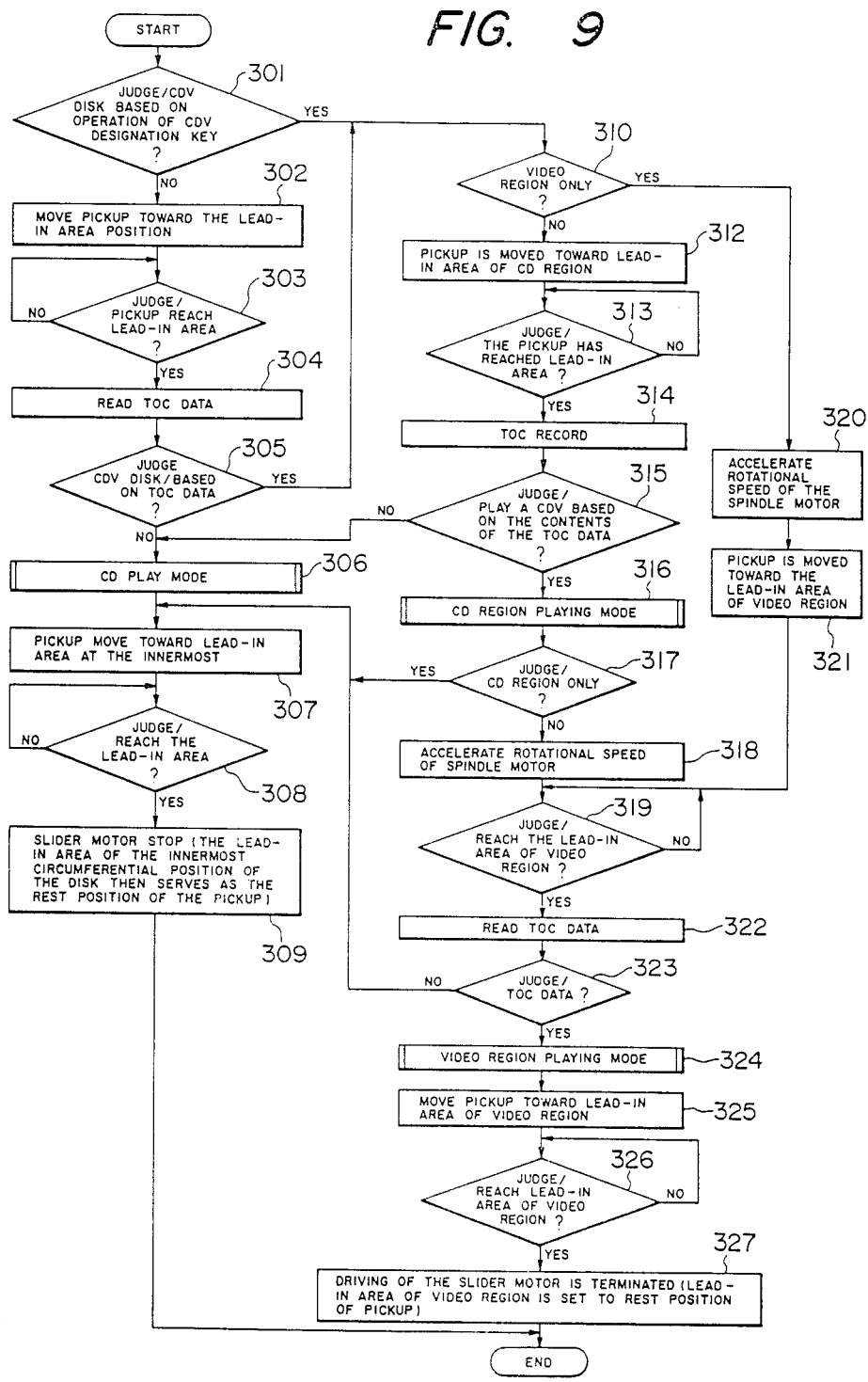
FIG. 9 is a flowchart describing the operations of a microcomputer contained within a system controller shown in FIG. 8.
Figure 10:
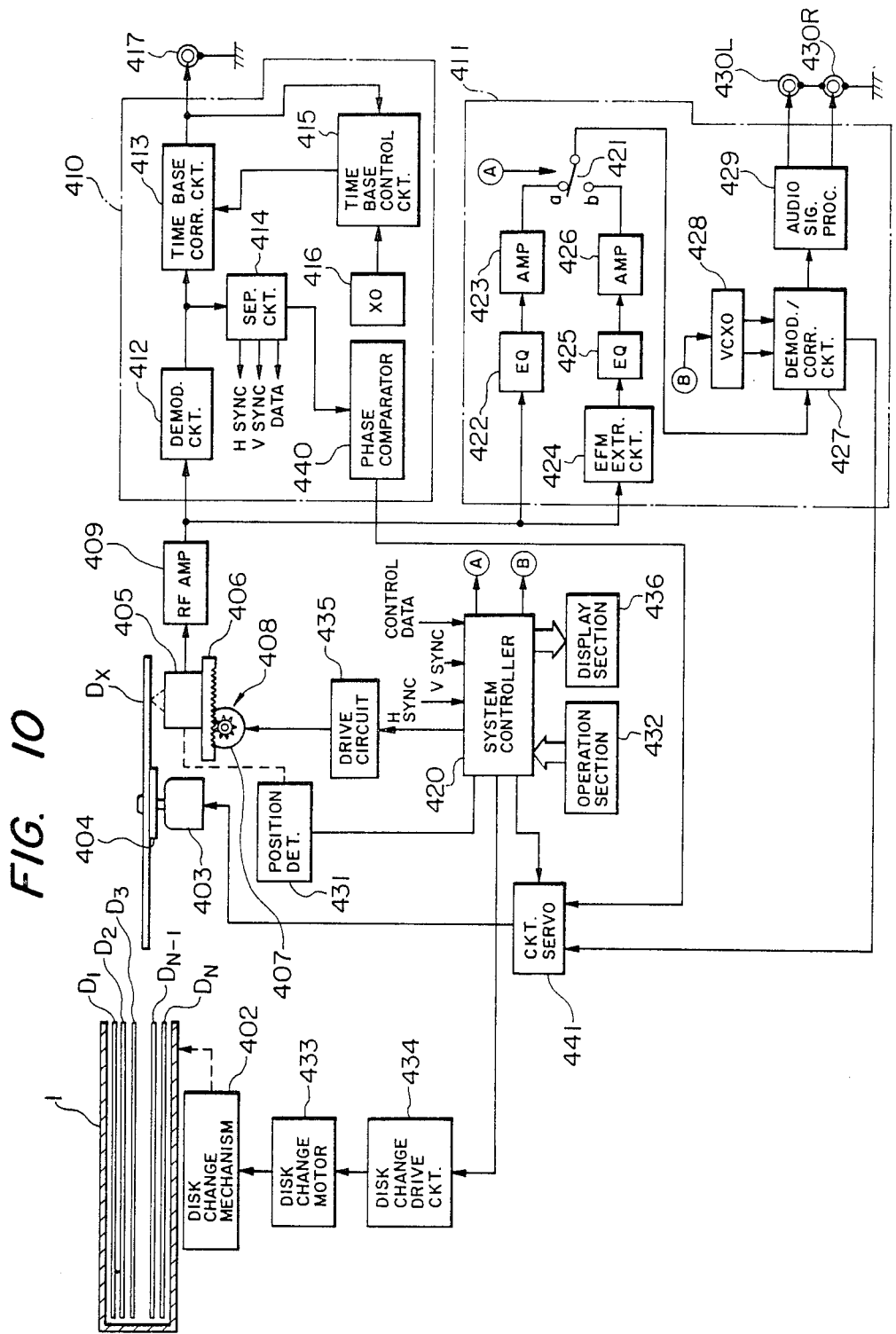
FIG. 10 is a block diagram showing another example of a disk reproducing device to which another embodiment of a reproducing method according to the present invention is applied.

Next, a disk playing operation in accordance with the playing method of the present invention executed by the microcomputer constituting the system controller 213 will be described with reference to the flowchart shown in FIG. 9.

Upon detecting that the disk is correctly set at the playing position by means of a switch (not shown), the microcomputer firstly judges whether or not the disk being set is a CDV disk based on the operation of the CDV designation key 218 (Step 301). When it is judged that it is not a CDV disk, meaning that the disk is a CD disk, the slider motor is driven so that the pickup 203 is moved toward the lead-in area position in the innermost circumferential portion of the disk (Step 302). It is judged whether or not the pickup 203 has reached the lead-in area based on the on or off state of the position sensor switch 210 (Step 303). When it is judged that the pickup 203 has reached the lead-in area in the innermost circumferential portion, the TOC data recorded in the lead-in area is read (Step 304). Based on this TOC data, it is decided whether the disk to be played is a CDV disk or not (Step 305). When it is judged that the disk to be played is not a CDV disk, indicating that a CD disk is to be played, the procedure is shifted to a CD play mode sub-routine (Step 306) so as to perform CD playing with the lead-in area at the innermost circumferential portion of the disk being the rest position of the pickup 203. Upon completion of the disk playing operation in the CD mode, the pickup 203 is moved toward the lead-in area at the innermost circumferential portion of the disk by driving the slider motor 205 with the motor drive circuit 216 (Step 307). It is judged whether the pickup 203 has reached the lead-in area in the innermost circumferential portion based on the on or off state of the position sensor switch 210 (Step 308). When the pickup 203 has reached the lead-in area, the driving of the slider motor 205 is stopped Step 309) and the lead-in area of the innermost circumferential position of the disk then serves as the rest position of the pickup 203.

In Step 301, on the other hand, when it is judged that a CDV disk is present based on the operation of the CDV designation key 218, it is then judged Whether or not the playing region designated by the region designation key 219 in the operation section 215 is the video region only (Step 310). If the video region only has not been designated, the slider motor 205 is driven by the motor drive circuit 216 so that the pickup 203 is moved toward the lead-in area of the CD region at the innermost circumferential portion of the disk in order to play the CD region (Step 312 . It is again judged whether or not the pickup 203 has reached the lead-in area in the CD region based on the on or off state of the position sensor switch 210 (Step 313). When judgment is made that the pickup 203 has reached the lead-in area of the CD region, the TOC data recorded in the lead-in area is read out Step 314), and it is judged, based on the contents of the TOC data, whether or not the disk being played is a CDV disk (Step 315). When judgment is made that the loaded disk is not a CDV disk, in the case where it is indicated that a CD disk is loaded, it is regarded that the CDV designation key has been erroneously operated and the procedure is shifted to the CD play mode in Step 306. In this case, while cancelling the instruction contents inputted by the CDV designation key 218, it is indicated by a display section 217 that the loaded disk is a CD disk. On the other hand, when it is judged that a CDV disk is loaded, the procedure is shifted to the CD region playing mode sub-routine (Step 316) in order to play the CD region. During the playing of the CD region where only audio data is reproduced, a blue color screen, for example, may be made to appear on the television monitor (not shown) based on blue color screen data generated by a character generator (not shown) provided in the video data When the disk playing operation in the CD region playing mode is terminated, it is judged whether the playing region designated by the region designation key 219 is the CD region only (Step 317), and if this is the case, the lead-in area at the innermost circumferential portion of the disk is determined as the rest position of the pickup 203 in order to move the pickup 203 to that area through steps 307, 308 and 309.

When it is judged that not the CD region only has been designated in Step 317, in the case where it is indicated that the playing of both the video and CD regions is designated, the rotational speed of the spindle motor 2 is accelerated to a maximum speed (about 2700 rpm) in the video region (Step 318). Judgment is made as to whether or not the pickup 205 has reached the lead-in area of the video region based on the output signal of the position sensor 214 (Step 319).

In Step 310, when it is judged that only the video region is designated, the rotational speed of the spindle motor 202 is accelerated to reach the maximum speed in the video region to reproduce the video region (Step 320), at the completion of which the pickup 203 is moved toward the lead-in area of the video region by driving the slider motor 205 with the motor drive circuit 216 (Step 321). Then, the procedure is shifted to Step 319.

Upon arrival of the pickup 203 at the lead-in area of the video region, the TOC data recorded in this lead-in area is read (Step 322), and judgment is made as to whether or not the TOC data can be read (Step 323). In the case where TOC data cannot be read, it is regarded that the CDV designation key 218 has been erroneously operated and a CDV disk not loaded. The procedure then is shifted to Step 307. When TOC data is read, the procedure is shifted to the video region playing mode sub-routine in order to play the video region (Step 324). In the video region, the video data subjected to FM modulation and the PCM audio data recorded in superimposed form are reproduced.

When the disk playing operation of the video region is terminated, the slider motor 205 is driven by the motor drive circuit 216 to move the pickup 203 toward the lead-in area of the video region (Step 325) while judgment is made as to whether or nor the pickup 203 has reached the lead-in area of the video region based on the output signal of the position sensor 214 (Step 326). When the pickup 203 has reached the lead-in area of the video region, the driving of the slider motor 205 is terminated (Step 327) and the lead-in area of the video region is set to be the rest position of the pickup 203.

The data recording disk playing method according to this embodiment of the present invention is applicable not only to a device in which a single disk is accommodated but also to a device in which a plural number of disks can be accommodated. In the latter case, if only the video region of a CDV disk selected from among the plurality of disks is to be repeatedly played, since the pickup reads the TOC data from the lead-in area of the video region, commencement of video reproduction can be quickly implemented compared with the case where the rest position of the pickup is set to the lead-in area of the CD region at all times.

The present invention can further be applied to a device capable of playing disks of different dimensions and signal formats from a CDV disk.

As described, according to the data recording disk playing method of this embodiment of the present invention, when it is detected that the playing of only the second region of the CDV disk is designated, the index data is directly read from the lead-in area of the second region without reading the index data from the lead-in area of the first region, and the pickup is stopped at a position corresponding to the lead-in area of the second region at the time when the playing of the second region is terminated. Therefore, when reproduction of only the video region of the CDV disk is desired, the reproduction of the video region can be quickly started.

Figure 11:
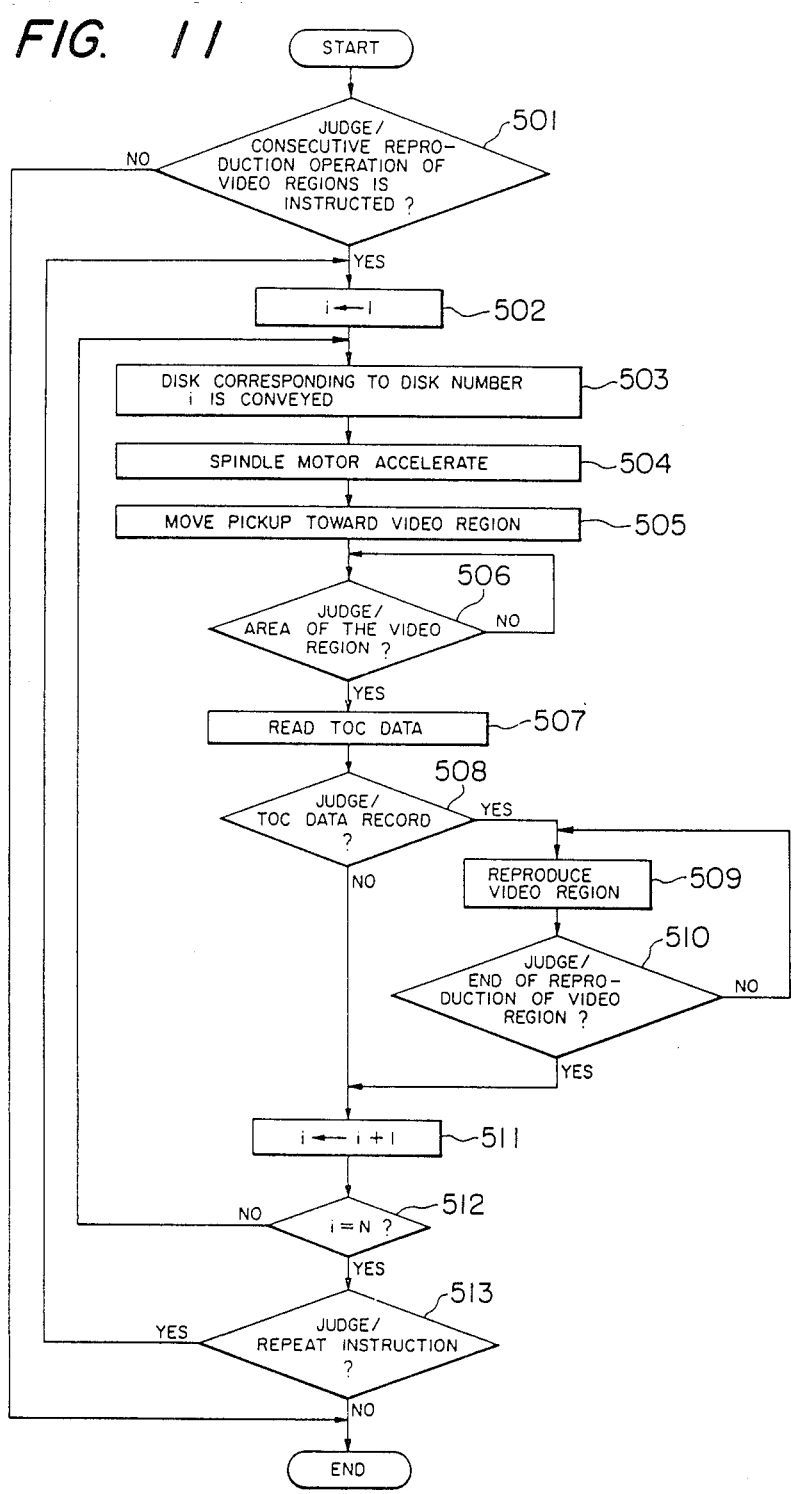
FIG. 11 is a flowchart describing the operations of a processor in the device of FIG. 10.

In FIG. 11, reference numeral 401 designates a magazine in which N disks $D_1$ to $D_N$ are accommodated in a stacked manner with a predetermined spacing between adjacent disks. The magazine 401 is detachably mounted on an attachment portion. One of the disks accommodated in the N disk accommodation positions provided in the magazine 401 is conveyed by a disk change mechanism 402 onto a disk carrying surface of a turntable fixedly secured to a spindle motor 403 and clamped thereto. Examples of the structure of the magazine 401 and the disk change mechanism 402 are described in Japanese Patent Application Laid-Open Publication No. 60-153651.

The recorded data of a disk $D_x$ clamped to the disk carrying surface of the turntable 404 is sensed by a pickup 405.

The pickup 405 incorporates: an optical system including a laser diode, an objective lens, and a photodetector; a focus actuator for moving the objective lens along an optical axis relative to the data recording surface of the disk D; and a tracking actuator for shifting the beam spot (data detection point) of a beam produced by the pickup 405 in the radial direction of the disk. The pickup 405 is mounted on a slider 406 which is freely movable in the radial direction of the disk. A slider motor 407 is provided as a driving source for the slider 406, and the latter is moved linearly by means of a transfer mechanism 408 inclusive of, for example, a rack and a pinion. An RF signal outputted from the pickup 405 is supplied through an RF amplifier 409 to both a video data demodulating circuit 410 and a digital data demodulating circuit 411.

In the video data demodulating circuit 410, an RF signal amplified by an RF amplifier 409 is supplied to a demodulation circuit 412, which may be an FM demodulator. The demodulated video signal is supplied to both a time base correction circuit 413 and a separation circuit 414. In the separation circuit 414, a horizontal sync signal (H sync), a vertical sync signal (V sync), and control data are extracted and separated from the video signal. The time base correction circuit 413 is provided with a variable delay element, such as a CCD (Charge-Coupled Device). The amount of delay of the variable delay element is changed in response to a control signal from a time base control signal from a time base control circuit 415, thereby performing time base correction. The time base control circuit 415 outputs a control signal indicative of the phase differences between an oscillation output of a crystal oscillator (XO) 416 and its frequency division output and the horizontal sync signal and a color burst signal extracted from the video signal and which has passed through the time base correction circuit 413. An example of the arrangement of the time base control circuit 415 is described in Japanese Patent Application Laid-Open Publication No. 56-10218. The video signal subjected to time base correction by the time base correction circuit 413 is supplied to a video output terminal 417.

In the digital data demodulating circuit 411, on the other hand, a selection switch 421 is provided the position of which is switched depending upon the region to be played (CD region or video region) when a composite disk is played. The movable contact of the switch 421 is set to the contact a when the CD region is played. Change-over of the movable contact of the switch 21 is performed in response to a change-over instruction generated by the system controller 420. In a composite disk, as previously described above, the rotational speed of the disk is greatly different between the CD region and the video region. Furthermore, as also described above, since a PCM audio signal in the form of an EFM signal is superimposed directly on an FM modulated video signal for recordation in the video region, which EFM signal adversely affects the lower frequency components of the FM video signal, the EFM signal is recorded at a level several tens of dB lower than the level of the video carrier while the same degree of modulation is maintained. Accordingly, the frequency characteristics and amplitudes of the EFM signal differ between the playing the CD region and the playing of the video region. For this reason, by switching the signal processing circuit of the reproduced EFM signal between the CD region and the video region, a common demodulating circuit can be used.

More specifically, when playing the CD region, the reproduced RF signal contains just the EFM signal, the frequency characteristic of which is compensated in an equalizer circuit 422 having a predetermined egualizing characteristic and then amplified with a predetermined gain by an amplifier 423. When playing the video region, on the other hand, an EFM signal together with an FM video signal is contained in the reproduced RF signal. The EFM signal is extracted in an EFM extraction circuit 424, which is formed by a LPF, and the frequency characteristic of the thus-extracted EFM signal is compensated in an equalizer circuit 425 having an equalizing characteristic different from that of the equalizer circuit 422. Further, the output of the equalizer circuit 425 is amplified by an amplifier 426 having a larger gain than the amplifier 23. Thus, an EFM signal is outputted which has the same frequency characteristic and amplitude as in the CD region.

It should be noted that the switch 421 is normally at the contact a when a compact disk is being played.

The reproduced EFM signal selected by the selection switch 421 is supplied to a modulation/correction circuit 427. In the circuit 427, the EFM signal is subjected to EFM demodulation, and the resultant signal is written in a memory, which may be a RAM. Input and output of data to the RAM is controlled based on a clock signal generated by the VCXO 428 to perform deinterleaving by a data exchanging operation Error correction is effected using parity bits contained in the data. Further, a frame sync signal is detected from the EFM signal. The digital audio signal, demodulated and corrected in the demodulation/correction circuit 427, is subjected to further signal processing in an audio signal processing circuit 429, which may include a D/A converter and a deglitching circuit, and thereafter supplied to audio output terminals 430L and 430R for left and right channels.

Control of the rotation of the disk is effected through a rotational servo switching circuit 441 in response to a phase error signal obtained from the demodulation/correction circuit 427 when the CD is played and in response to an error signal obtained from the phase comparison circuit 440 at the time of video reproduction. The phase comparison circuit 440 generates an error signal corresponding to the phase difference between the output of the separation circuit 414 and a reference signal. The oscillator 428 generates a fixed frequency clock signal when a CD is played and acts as a VCXO (variable frequency oscillator) during video reproduction. Changeover of the oscillator 428 is performed by the system controller 420.

Proximate to the path of movement of the pickup 405 in the radial direction of the disk is disposed a position detector 43 which detects the arrival of the beam spot from the pickup 405 at a position corresponding to the vicinity of the boundary between the CD region and the video region of the composite disk and generates a detection signal at that instant. The arrival of the pickup 405 at the video region is thus indicated by the occurrence of the detection signal. Conventionally known devices, such as an optical sensor, can be used for the position sensor 431. The detection signal outputted by the position sensor 431 is supplied to the system controller 420.

The system controller 420 is constituted with a microcomputer having a processor, ROM and RAM. To the system controller 420 are supplied: the horizontal sync signal, the vertical sync signal and the control data, all of which are fed from the separation circuit 414; the frame sync signal from the demodulation/correction circuit 427; and various instruction signals from the operation section 432 instructing, for example, performance of a consecutive reproduction operation of the video regions. In the system controller 420, the processor processes input signals in accordance with programs stored in the ROM, and controls the various sections, such as the selection switch 421, a driving circuit (not shown) for driving the spindle motor 403, a disk change driving circuit 434 for supplying a driving current corresponding to an instruction to a disk change motor 433 for driving the disk change mechanism 402, a driving circuit 435 for driving the slider motor 407, and a display section 436.

Next, a procedure employing a reproducing method according to this embodiment of the invention and which is executed by the processor constituting the system controller 420 will be described with reference to the flowchart shown in FIG. 11.

During the execution of the main routine, the processor is shifted to Step 501 by an interrupt generated by, for example, a timer, whereupon it is judged whether or nor a consecutive reproduction operation of video regions is instructed. If the answer is negative (no) in Step 501, the processor is immediately reset to the execution of the routine immediately before shifting to Step 501. If the answer is affirmative (yes)in Step 501, a predetermined address of the RAM storing the disk number to be reproduced is initialized to 1 (one) in Step 502. Next, an instruction is sent to the disk change driving circuit 434 so that the disk corresponding to the disk number i, which number was retrieved from the predetermined address of the RAM, is conveyed onto the disk carrying surface of the turntable 404 and clamped thereto Step 503). The processor then causes the spindle motor 403 to accelerate to a maximum rotational speed (Step 504), and simultaneously causes the slider motor 407 to rotate at a high speed to thereby move the pickup 405 toward the video region at a high speed (Step 505).

Next, the processor detects from the detection output of the position sensor 431 (Step 506) that the beam spot of the pickup 405 has reached the video region, reads the TOC data (Step 507), and judges whether or not TOC data recorded in the lead-in area of the video region has been obtained (Step 508).

When it is judged that such data has been obtained in Step 508, the processor controls various sections so as to reproduce he Video region Step 509). Thereafter, when the processor detects the end of the reproduction of the video region (Step 510), 1 (one) is added to the disk number i stored in the predetermined address of the RAM (Step 511). Next, the processor judges whether or not the disk number i is equal to N (Step 512).

If the answer is negative (no) in Step 512, the processor is again shifted to Step 503. If the answer is affirmative (yes) in Step 512, the processor judges whether or not a repeat instruction is present (Step 513). When the answer is affirmative in Step 513, the processor is again shifted to Step 502, whereas when the answer is negative, the processor restarts the execution of the routine which was being performed immediately before shifting to the Step 501.

When the disk is conveyed and placed on the turntable 404 with the operations in Step 503 through 506, the pickup 505 is immediately moved to a position corresponding to the lead-in area of the video region without reading the TOC data recorded in the CD region. Since it is possible to judge whether the disk on the turntable 504 is a composite disk or not through the judgment of whether TOC data recorded in the lead-in area of the video disk can be read or not, the video region only of the composite disk can be reproduced without fail without reading the TOC data recorded in the lead-in area of the CD region, even if a disk other than the composite disk is present. Thus, the period of time during which the video signal is not present can be shortened.

As described in detail above, in accordance with a further embodiment of the reproducing method for a disk reproducing device according to the invention, when data from each of a plurality of disks upon sequentially selected from among a plurality of disks accommodated in a plurality of disk accommodation positions and conveyed to the reproducing position, a pickup is immediately moved to a position within a second region on which a video signal and a prescribed digital signal are recorded in superimposed form, judgment is made as to whether or not the output of the pickup contains predetermined data recorded in the predetermined portion within the second region, and after reproduction of the entirety of the second region in accordance with the result of this judgment has been completed, another disk to be subsequently reproduced is selected. With this arrangement, reproduction of data in the video region can be carried out without fail, even if the TOC data are omitted, and thus the period of time during which video data are not present is shortened.

What is claimed is:

1. A method for playing a data recording disk having a first region in which only a digital signal is recorded and a second region in which a multiplex signal containing a frequency modulated video signal and a digital signal is recorded, said second region including a lead-in area, the improvement comprising the steps of: selecting at least one of said first and second regions for playing; determining when only said second region is selected for playing; and when only said second region is selected for playing, immediately moving a data detection point of a pickup toward said lead-in area of said second region and starting reading data from said lead-in area.

2. The method of claim 1, further comprising the steps of: when said pickup reaches said lead-in area of said second region, reading data in an area in said lead-in region where table-of-contents information may be recorded; and, if no table-of-contents information can be read in said lead-in area, terminating playing of said second region and moving said pickup to play said first region.

3. In a playing method for a composite disk having a first region in which is recorded only a digital signal and a second region in which is recorded a multiplex signal containing a video data signal and a digital signal, each of said first and second regions having a lead-in area containing index data indicative of recording contents, the improvement comprising the steps of: detecting when playing of only said second region of said composite data recording disk is selected; when playing only said second region is selected, directly reading said index data from the lead-in area of said second region with a pickup without reading said index data from the lead-in area of said first region; detecting when playing of said second region is terminated; and when playing of said second regions is terminated, stopping said pickup at a position corresponding to the lead-in area of said second region.

4. The playing method of claim 3, further comprising the initial steps of: detecting whether or not said disk is a composite disk; when said disk is a composite disk, immediately moving said pickup to said lead-in area of said second region, an otherwise moving said pickup to said lead-in area of said first region.

5. The playing method of claim 3, further comprising the steps of: determining whether said index data of said lead-in area of said second region indicates said disk is a composite disk; and, if said disk index data indicates said disk is not a composite disk, moving said pickup to said lead-in area of said first region.

6. A reproducing method for a disk reproducing device capable of reproducing a data recording disk having a first region in which only a first digital signal is recorded and a second region in which a freguency modulated video signal and a second digital signal are recorded in a superimposed manner, said device having a plurality of accommodating positions for accommodating said disks and detection means for detecting when a data detection point of a pickup reaches a position in the vicinity of a boundary of said first and second regions and generating a detection signal at that instant, said method comprising the steps of: selecting one said plurality of data recording disks accommodated in said plurality of accommodating positions; conveying the selected disk to a reproducing position; immediately moving said data detection point of said pickup to a position on said disk corresponding to a predetermined portion within said second region in response to said detection signal; judging whether an output of said pickup contains predetermined data recorded in said predetermined portion within said second region; and after reproducing recording data from the entirety of said second region in accordance with the result of said judgment, selecting another data recording disk to be subsequently reproduced.

* * * * *